(12) United States Patent
Joh

(10) Patent No.: US 8,976,427 B2
(45) Date of Patent: Mar. 10, 2015

(54) IMAGE FORMING APPARATUS AND METHOD OF CONTROLLING THE SAME

(71) Applicant: Samsung Electronics Co., Ltd., Suwon-si, Gyeonggi-do (KR)

(72) Inventor: Seung Je Joh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/920,657

(22) Filed: Jun. 18, 2013

(65) Prior Publication Data

US 2013/0342879 A1 Dec. 26, 2013

(30) Foreign Application Priority Data

Jun. 21, 2012 (KR) ........................ 10-2012-0067030

(51) Int. Cl.
*H04N 1/04* (2006.01)
*H04N 1/00* (2006.01)
*H04N 1/10* (2006.01)
*H04N 1/12* (2006.01)
*H04N 1/193* (2006.01)
*H04N 1/48* (2006.01)

(52) U.S. Cl.
CPC ............. *H04N 1/00588* (2013.01); *H04N 1/10* (2013.01); *H04N 1/12* (2013.01); *H04N 1/193* (2013.01); *H04N 1/00822* (2013.01); *H04N 1/0464* (2013.01); *H04N 1/486* (2013.01)

USPC ............ 358/486; 358/496; 358/474; 358/497

(58) Field of Classification Search
USPC .................................. 358/498, 496, 474, 497
See application file for complete search history.

(56) References Cited

U.S. PATENT DOCUMENTS

| 5,903,363 | A | 5/1999 | Yaguchi et al. |
| 7,969,623 | B2 * | 6/2011 | Kagami et al. ................ 358/498 |
| 2009/0091807 | A1 * | 4/2009 | Kagami et al. ................ 358/486 |

OTHER PUBLICATIONS

Extended European Search Report mailed Nov. 15, 2013 in related European Application No. 13173242.2.

* cited by examiner

*Primary Examiner* — Houshang Safaipour
(74) *Attorney, Agent, or Firm* — Staas & Halsey LLP

(57) ABSTRACT

An image forming apparatus and a method of controlling the same are provided. The image forming apparatus includes a document feeder to feed an original document, a time delay integration image sensor to scan the original document and read image data, and a controller to activate a time delay integration function of the time delay integration image sensor when a direction for feed of the original document corresponds to a sub-scanning direction of the time delay integration image sensor, and to deactivate the time delay integration function of the time delay integration image sensor when the direction for feed of the original document does not correspond to the sub-scanning direction of the time delay integration image sensor, during reading of the original document.

14 Claims, 10 Drawing Sheets

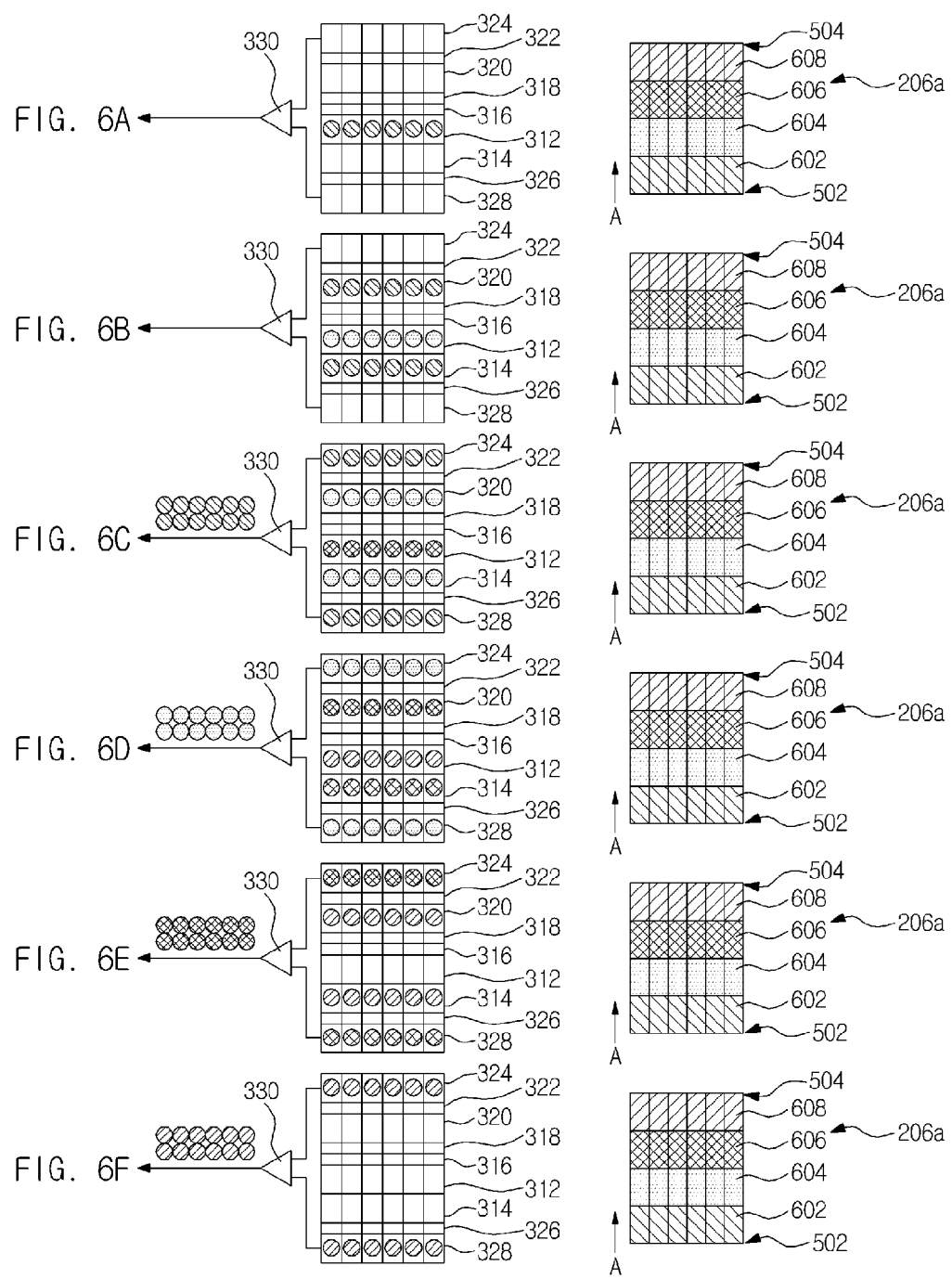

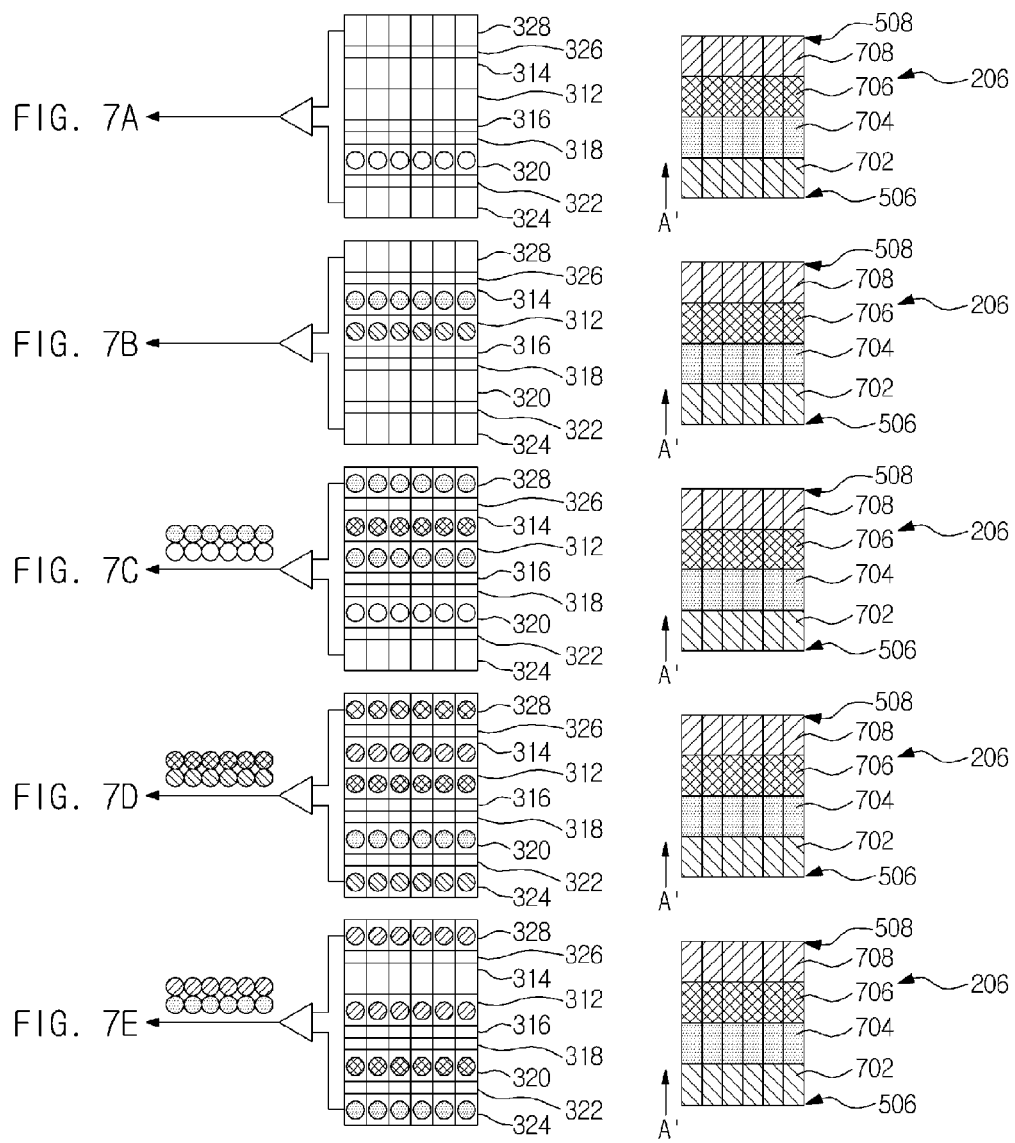

IMAGE FORMING APPARATUS AND METHOD OF CONTROLLING THE SAME

CROSS-REFERENCE TO RELATED APPLICATIONS

This application is related to, and claims priority to, Korean Patent Application No. 10-2012-0067030, filed on Jun. 21, 2012 in the Korean Intellectual Property Office, the disclosure of which is incorporated herein by reference.

BACKGROUND

1. Field

Embodiments of the present invention relate to an image forming apparatus that reads image data from an original document to form or print a digital image so as to perform operations such as copy, scanning, and the like, and a method of controlling the same.

2. Description of the Related Art

An image forming apparatus uses an image sensor in order to read image data from an original document. The image sensor receives light reflected from a surface of the original document and converts the light into an electrical signal to generate image data (image).

When the image data is read from the original document, the sensitivity of the image sensor is an important factor to determine operation speed and quality. That is, a high quality image may be formed at high speed only when the image sensor receives a large amount of light within a short period of time. However, advanced technical skills and high manufacturing costs are required to increase the sensitivity of the image sensor, and thus, there is a need to realize high operation speed at low costs.

SUMMARY

It is an aspect of an exemplary embodiment of the present invention to provide an image forming apparatus including a time delay integration image sensor for improvement of image quality and operation speed, thereby obtaining high image quality at high speed.

Additional aspects of the invention will be set forth in part in the description which follows and, in part, will be obvious from the description, or may be learned by practice of the invention.

In accordance with an aspect of the present invention, an image forming apparatus includes at least one document feeder to feed an original document, a time delay integration image sensor to scan the original document and read image data, and a controller to activate a time delay integration function of the time delay integration image sensor when a direction for feed of the original document corresponds to a sub-scanning direction of the time delay integration image sensor, and to deactivate the time delay integration function of the time delay integration image sensor when the direction for feed of the original document does not correspond to the sub-scanning direction of the time delay integration image sensor, during reading of the original document.

The at least one document feeder may include a first document feeder to feed the original document in a first direction, and a second document feed to feed the original document in an opposite direction to the first direction.

The first document feeder may be a sheet feed type document feeder to automatically feed the original document, and the second document feeder may be a platen type document feeder to fix the original document onto a platen glass.

The time delay integration image sensor may include a first pixel array, and a second pixel array installed to be spaced apart from the first pixel array by a predetermined interval in the sub-scanning direction.

The first pixel array may be a time delay integration pixel array.

In accordance with an aspect of the present invention, an image forming apparatus includes at least one document feeder to feed an original document, a time delay integration image sensor to scan the original document and read image data, and a controller to activate a time delay integration function of the time delay integration image sensor and to read the image data from the original document, and to perform image correction for improvement of quality of the image data when a direction for feed of the original document does not correspond to a sub-scanning direction of the time delay integration image sensor.

The at least one document feeder may include a first document feeder to feed the original document in a first direction, and a second document feed to feed the original document in an opposite direction to the first direction.

The first document feeder may be a sheet feed type document feeder to automatically feed the original document, and the second document feeder may be a platen type document feeder to fix the original document onto a platen glass.

The time delay integration image sensor may include a first pixel array, and a second pixel array installed to be spaced apart from the first pixel array by a predetermined interval in the sub-scanning direction.

The first pixel array may be a time delay integration pixel array.

In accordance with a further aspect of the present invention, a method of controlling an image forming apparatus including at least one document feeder to feed an original document, and a time delay integration image sensor to scan the original document and read image data includes receiving an operation command, reading image data from the original document in response to the operation command, activating a time delay integration function of the time delay integration image sensor when a direction for feed of the original document corresponds to a sub-scanning direction of the time delay integration image sensor during reading of the original document, and deactivating the time delay integration function of the time delay integration image sensor when the direction for feed of the original document does not correspond to the sub-scanning direction of the time delay integration image sensor during the reading of the original document.

In accordance with an aspect of the present invention, a method of controlling an image forming apparatus including at least one document feeder to feed an original document, and a time delay integration image sensor to scan the original document and read image data includes receiving an operation command, activating a time delay integration function of the time delay integration image sensor to read image data from the original document in response to the operation command, and performing image correction for improvement of quality of the image data when a direction for feed of the original document does not correspond to a sub-scanning direction of the time delay integration image sensor.

In accordance with an aspect of the present invention, an image forming apparatus includes a first document feeder to feed an original document in a first direction, a second document feed to feed the original document in a second direction, a time delay integration image sensor to scan the original document fed through the first document feeder in a first sub-scanning direction to read image data, and to scan the original document fed through the second document feeder in a second sub-scanning direction to read image data, and a controller to deactivate a time delay integration function of the time delay integration image sensor when the original document fed through the first document feeder is scanned in the first sub-scanning direction to read the image data, and to activate the time delay integration function of the time delay integration image sensor when the original document fed through the second document feeder is scanned in the second sub-scanning direction to read the image data.

The first document feeder may be an automatic document feeder to automatically feed the original document and transfer the original document along a preset feed path such that the original document is scanned by the image sensor while being transferred on a sensing surface of the time delay integration image sensor in an opposite direction to the first sub-scanning direction, and the second document feeder may be a platen type document feeder to allow the original document aligned on a surface of a platen glass to be scanned while the time delay integration image sensor moves in the second sub-scanning direction when the original document is aligned on the surface of the platen glass.

The first document feeder may be a platen type document feeder to allow the original document aligned on a surface of a platen glass to be scanned while the time delay integration image sensor moves in the second sub-scanning direction when the original document is aligned on the surface of the platen glass, and the second document feeder may be an automatic document feeder to automatically feed the original document and transfer the original document along a preset feed path such that the original document is scanned by the image sensor while being transferred on a sensing surface of the time delay integration image sensor in an opposite direction to the first sub-scanning direction.

In accordance with an aspect of the present invention, an image forming apparatus including a time delay integration image sensor for improvement of image quality and operation speed may obtain high image quality at high speed.

BRIEF DESCRIPTION OF THE DRAWINGS

These and/or other aspects of the invention will become apparent and more readily appreciated from the following description of the embodiments, taken in conjunction with the accompanying drawings of which:

FIGS. 6A-6F illustrate an exemplary process of acquiring image data using an image sensor in a platen type method;

FIGS. 7A-7E illustrate an exemplary process of acquiring image data using an image sensor in a sheet feed type method;

DETAILED DESCRIPTION

Reference will now be made in detail to the embodiments of the present invention, examples of which are illustrated in the accompanying drawings.

Figure 1:
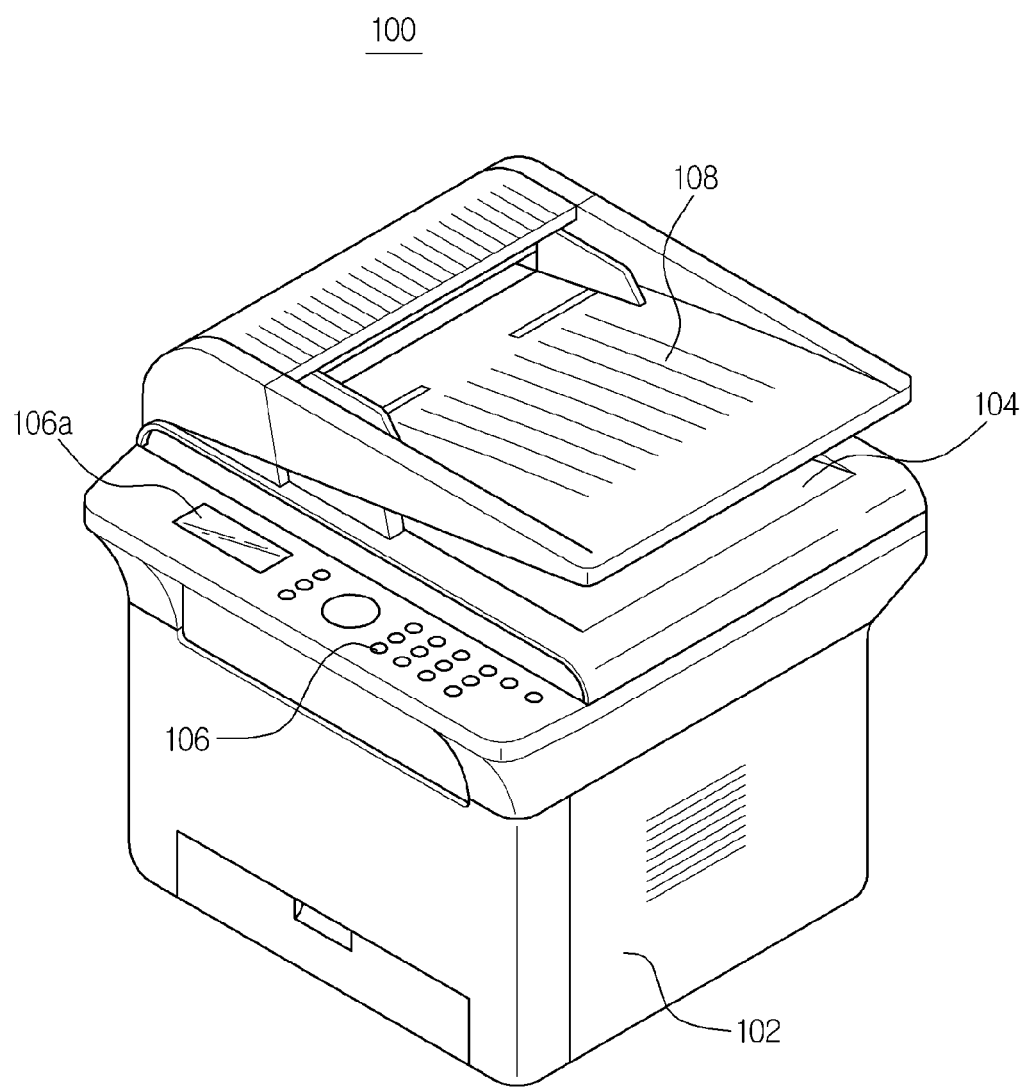
FIG. 1 illustrates an image forming apparatus according to an embodiment of the present invention.

FIG. 1 illustrates an image forming apparatus 100 according to an embodiment of the present invention. As illustrated in FIG. 1, the image forming apparatus 100 according to an exemplary embodiment includes a main body 102 and a cover 104 disposed on the main body 102. A user interface 106 may be disposed on the main body 102 such that a user may manipulate the image forming apparatus 100. The user interface 106 may include a display 106a through which a guidance message required for manipulation of the image forming apparatus 100 or information regarding a current operation state of the image forming apparatus 100 is displayed.

The image forming apparatus 100 of FIG. 1 may be a multi-function device that is a combination, for example, of a printer, a copier, and a scanner. In this regard, for copy and scanning, image data needs to be read from an original document 206 (see, for example, FIG. 2) to be copied or scanned. An image sensor 202 (see FIG. 2) may be moved over a surface of the fixed original document 206 or the original document 206 may be moved over a sensing surface of the image sensor 202. A method of moving the image sensor 202 over the surface of the fixed original document 206 may be referred to as a platen type or flat bed type method, and a method of moving the original document 206 over the sensing surface of the fixed image sensor 202 may be referred to as a sheet feed type method. According to an exemplary embodiment, the image forming apparatus 100 may employ one or both the flat bed type method and the sheet feed type method.

In the platen type or flat bed type method, copy or scanning is performed while the original document 206 is fixed, and thus, the original document 206 is barely moved, thereby obtaining high quality copy or scanning. In the sheet feed type method using an automatic document feeder 108, many original documents 206 may be quickly copied or scanned. In order to support the sheet feed type method, the automatic document feeder 108 may be installed on the cover 104.

Figure 2:
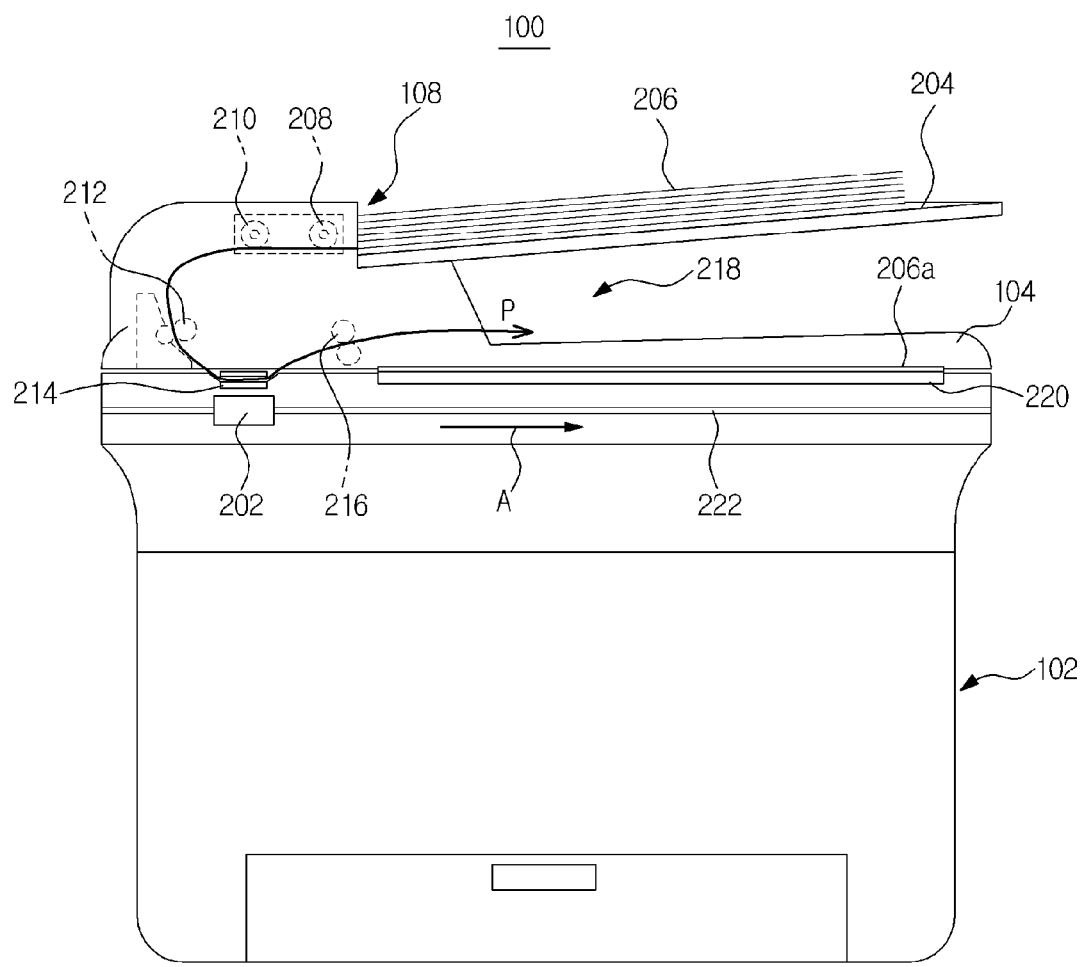
FIG. 2 illustrates an exemplary image forming apparatus.

FIG. 2 illustrates an exemplary image forming apparatus 100. As illustrated in FIG. 2, the image sensor 202 to read image data from the original document 206 fed through the automatic document feeder 108 may be installed in the main body 102. The image sensor 202 is a color linear image sensor that converts an optical signal reflected from a surface of the original document 206 into an electrical signal to form image data.

The automatic document feeder 108 may be configured in such a way that the original document 206 fed through the automatic document feeder 108 has a transfer path P with a "C" shape, viewed from a front surface of the image forming apparatus 100. That is, the original document 206 loaded on a document feeding table 204 passes a window 214 of the automatic document feeder 108 through a pickup roller 208, a transfer roller 210, and a feeding roller 212. The window 214 may be disposed directly over the image sensor 202, and thus, the original document 206 is scanned by the image sensor 202 while passing the window 214. The original document 206 having scanned by the image sensor 202 is discharged through an exit roller 216 and is loaded on a document loading tray 218.

In the platen type method (or the flat bed type method), an original document 206a may be read, but not through the automatic document feeder 108. When a user opens the cover 104, and then issues a copy or scanning command while the original document 206a is aligned on a platen glass 220 disposed on an upper surface of the main body 102, the image sensor 202 scans the original document 206a to read image data while moving along a guide rail 222 below the platen glass 220 in a direction indicated by an arrow A illustrated in FIG. 2. The direction indicated by the arrow A is a sub-scanning direction of the image sensor 202.

In FIG. 2, the automatic document feeder 108 that is a sheet feed type document feeder is classified as a first document feeder and a platen type document feeder is classified as a second document feeder.

Figure 3:
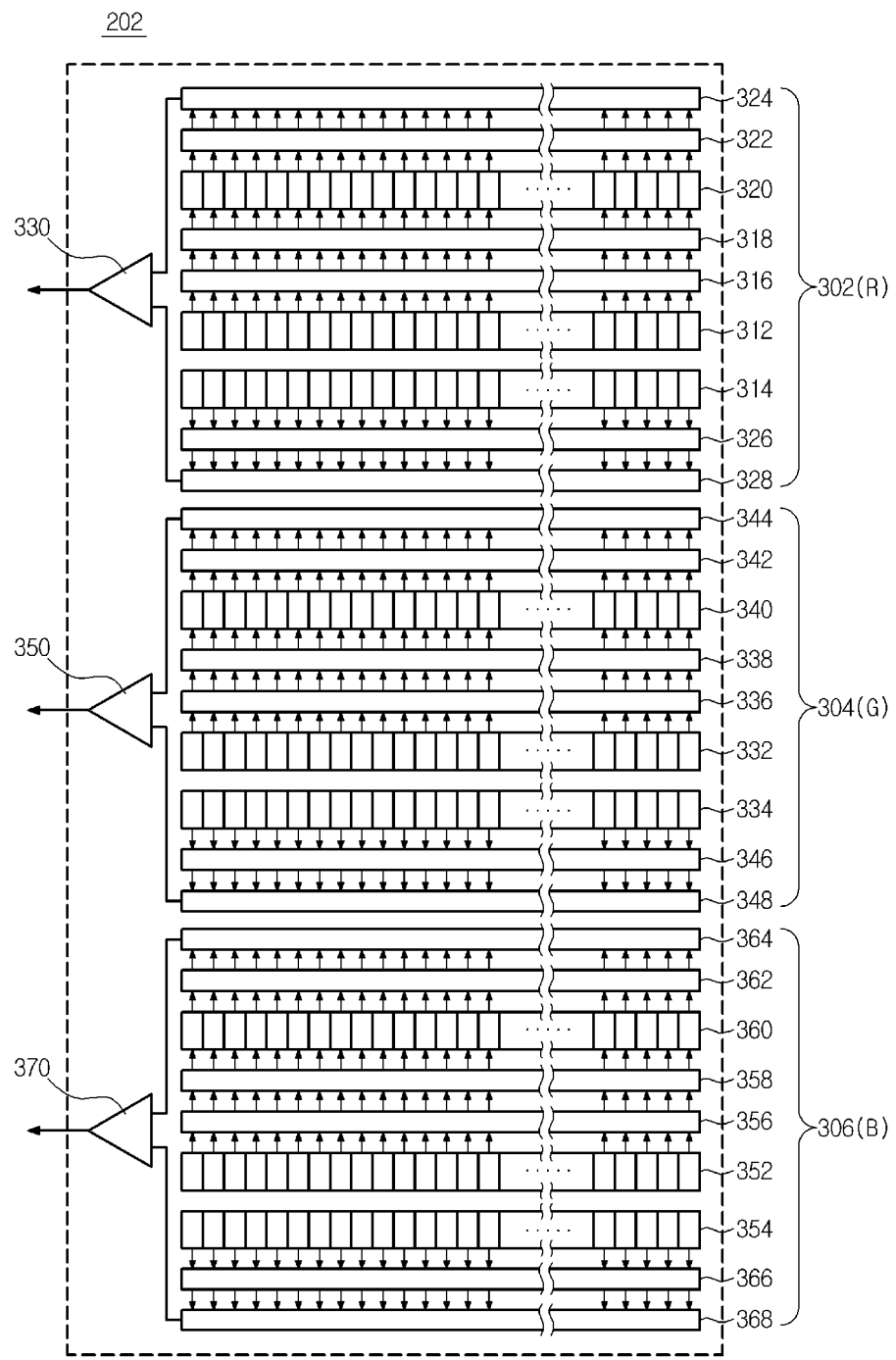
FIG. 3 illustrates an exemplary image sensor.

FIG. 3 illustrates a structure of the image sensor 202 illustrated in FIG. 2. As illustrated in FIG. 3, the image sensor 202 includes a red (R) channel 302 to acquire red color information, a green (G) channel to acquire green color information, and a blue (B) channel 306 to acquire blue color information. The R channel 302, the G channel 304, and the B channel 306 are arranged in one line in a sub-scanning direction (a direction indicated by an arrow A illustrated in FIG. 2) of the image sensor 202 and acquire image data in an RGB order while the image sensor 202 moves in the sub-scanning direction.

The R channel 302 includes a time delay integration pixel array 312 (which is a first pixel array) and a normal pixel array 314 (which is a second pixel array). Hereinafter, time delay integration is referred to as TDI. The use of the term "normal" of the normal pixel array 314 is merely for distinguishing the array from the TDI pixel array 312. The TDI pixel array 312 may be disposed upstream (forward) of the sub-scanning direction as compared with the normal pixel array 314. Thus, when the original document 206a is scanned, the TDI pixel array 312 acquires image data of the original document 206a in advance, and then the normal pixel array 314 acquires image data of the original document 206a after a predetermined period of time elapses. A physical distance between the TDI pixel array 312 and the normal pixel array 314 may be 5.25 micrometers, and thus, a time difference between a time when the image data is acquired by the TDI pixel array 312 and a time when the image data is acquired by the normal pixel array 314 may be determined according to movement speed of the image sensor 202. Each of the TDI pixel array 312 and the normal pixel array 314 may include 5360 pixels. The image data acquired by the TDI pixel array 312 is converted into an electrical signal, may be temporally stored in a TDI pixel data storage 320 through a shift gate 316 and a TDI gate 318, and then, may be transmitted to a charge coupled device (CCD) shift register 324 through a storage clear gate 322. As illustrated in FIG. 3, data is transmitted in parallel from the TDI pixel array 312 to the CCD shift register 324. Data of the CCD shift register 324 is serially (sequentially) output out of the image sensor 202 through an adder 330. The image data acquired by the normal pixel array 314 is converted into an electrical signal and is transmitted to a CCD shift register 328 through a shift gate 326. Data is transmitted in parallel from the time delay integration pixel array 312 to the CCD shift register 328. According to an exemplary embodiment, the image data acquired by the TDI pixel array 312 is transmitted to the CCD shift register 324 and the image data acquired by the normal pixel array 314 is transmitted to another CCD shift register, that is, the CCD shift register 328. Information of each of the two CCD shift registers 324 and 328 is output out of the image sensor 202 through the adder 330.

The G channel 304 includes a TDI pixel array 332 and a normal pixel array 334. The TDI pixel array 332 is disposed upstream (forward) of the sub-scanning direction as compared with the normal pixel array 334. Thus, when the original document 206a is scanned, the TDI pixel array 332 acquires image data of the original document 206a in advance, and then, the normal pixel array 334 acquires image data of the original document 206a after a predetermined period of time elapses. A physical distance between the TDI pixel array 332 and the normal pixel array 334 may be 5.25 micrometers, and thus, a time difference between a time when the image data is acquired by the TDI pixel array 332 and a time when the image data is acquired by the normal pixel array 334 may be determined according to the movement speed of the image sensor 202. Each of the TDI pixel array 332 and the normal pixel array 334 may include 5360 pixels. The image data acquired by the TDI pixel array 332 is converted into an electrical signal, is temporally stored in a TDI pixel data storage 340 through a shift gate 336 and a TDI gate 338, and then, is transmitted to a CCD shift register 344 through a storage clear gate 342. As illustrated in FIG. 3, data is transmitted in parallel from the TDI pixel array 332 to the CCD shift register 344. Data of the CCD shift register 344 is serially (sequentially) output out of the image sensor 202 through an adder 350. The image data acquired by the normal pixel array 334 is converted into an electrical signal and is transmitted to a CCD shift register 348 through a shift gate 346. Data is transmitted in parallel from the TDI pixel array 332 to the CCD shift register 348. According to an exemplary embodiment, the image data acquired by the TDI pixel array 332 is transmitted to the CCD shift register 348 and the image data acquired by the normal pixel array 334 is transmitted to another CCD shift register, that is, the CCD shift register 348. Information of each of the two CCD shift registers 344 and 348 is output out of the image sensor 202 through the adder 350.

The B channel 306 includes a TDI pixel array 352 and a normal pixel array 354. The TDI pixel array 352 is disposed upstream (forward) of the sub-scanning direction as compared with the normal pixel array 354. Thus, when the original document 206a is scanned, the TDI pixel array 352 acquires image data of the original document 206a in advance, and then the normal pixel array 354 acquires image data of the original document 206a after a predetermined period of time elapses. A physical distance between the TDI pixel array 352 and the normal pixel array 354 may be 5.25 micrometers, and thus, a time difference between a time when the image data is acquired by the TDI pixel array 352 and a time when the image data is acquired by the normal pixel array 354 may be determined according to the movement speed of the image sensor 202. Each of the TDI pixel array 352 and the normal pixel array 354 may include 5360 pixels. The image data acquired by the TDI pixel array 352 is converted into an electrical signal, is temporally stored in a TDI pixel data storage 360 through a shift gate 356 and a TDI gate 358, and then, is transmitted to a CCD shift register 364 through a storage clear gate 362. As seen from FIG. 3, data is transmitted in parallel from the TDI pixel array 352 to the CCD shift register 364. Data of the CCD shift register 364 is serially (sequentially) output out of the image sensor 202 through an adder 370. The image data acquired by the normal pixel array 354 is converted into an electrical signal and is transmitted to a CCD shift register 368 through a shift gate 366. Data is transmitted in parallel from the TDI pixel array 352 to the CCD shift register 368. According to an exemplary embodiment, the image data acquired by the TDI pixel array 352 is transmitted to the CCD shift register 364 and the image data acquired by the normal pixel array 354 is transmitted to another CCD shift register, that is, the CCD shift register 368. Information of each of the two CCD shift registers 364 (and 368 is output out of the image sensor 202 through the adder 370.

Figure 4:
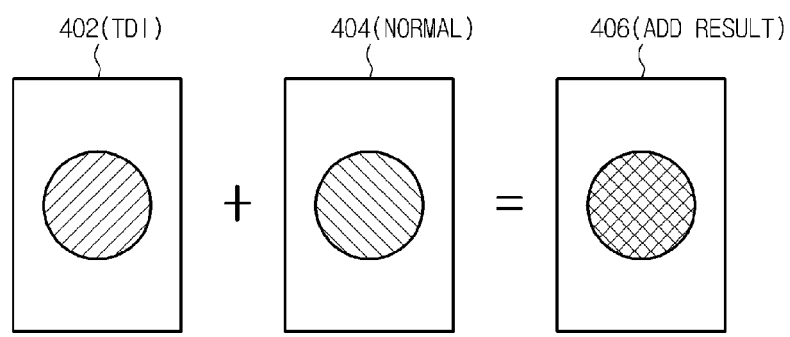
FIG. 4 illustrates an exemplary image quality improvement using time delay integration applicable to an image forming apparatus according to an embodiment of the present invention.

FIG. 4 illustrates an exemplary image quality improvement using TDI applicable to an image forming apparatus according to an embodiment of the present invention. As illustrated in FIG. 4, several dim or unclear images may overlap each other, thereby obtaining a clearer image. That is, a TDI function improves image quality by acquiring a plurality of image data from the same target object (e.g., the same location or region of an original document) at time delay and then integrating the plurality of image data to obtain high sensitivity of an image sensor. With regard to the R channel 302 described with reference to FIG. 3, image data 402 may be acquired by the TDI pixel array 312 at a time Ti and then image data 404 may be acquired by the normal pixel array 314 at a time Ti+1, once again with respect to the same location or region of the original document 206a. The image data 402 acquired by the TDI pixel array 312 and the image data 404 acquired by the normal pixel array 314 are cumulatively integrated, thereby increasing the sensitivity of the image sensor 202, like in image data 406.

Figure 5A:
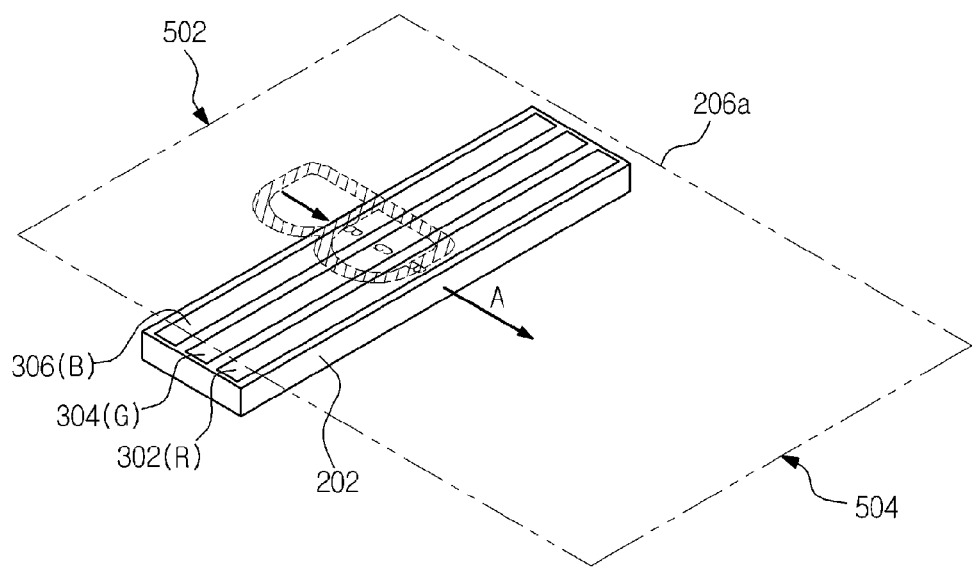
FIGS. 5A-5B illustrate an exemplary difference in a sub-scanning direction of an image sensor according to a document feeding method in an image forming apparatus according to an embodiment of the present invention.
Figure 5B:
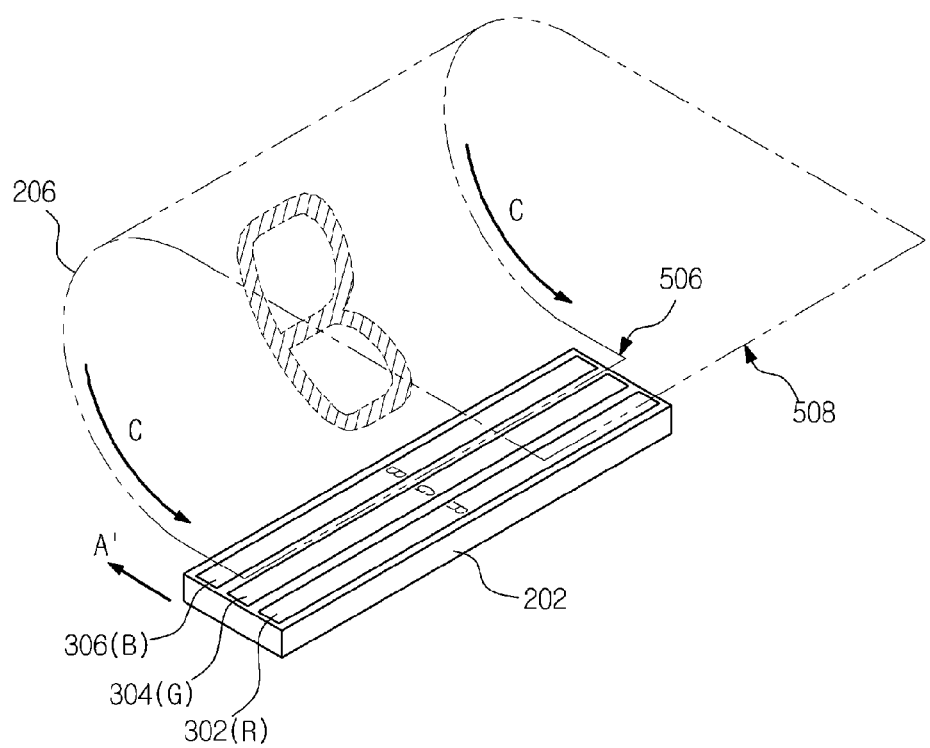

FIGS. 5A-5B illustrate an exemplary difference in a sub-scanning direction of an image sensor according to a document feeding method in an image forming apparatus according to an embodiment of the present invention. As illustrated in FIG. 5A, when copy or scanning is performed using a platen type method, the image sensor 202 reads image data of the original document 206a while moving from a start portion 502 of the original document 206a toward an end portion 504 in a sub-scanning direction A on an opposite surface of a record surface of the original document 206a to which the platen glass 220 is fixed. According to an exemplary embodiment, the image data is read from the start portion 502 of the original document 206a in an order of R→G→B channels.

However, as illustrated in FIG. 5B, in the sheet feed type method, image data of the original document 206 fed in a direction C through the automatic document feeder 108 is read by the image sensor 202, the direction of which is fixed, and thus, the sub-scanning direction is A' such that image data is read from a start portion 506 of the original document 206 to an end portion 508 in an order of B→G→R channels.

That is, when copy or scanning is performed using the platen type method and the sheet feed type method, orders in which the R, G, and B channels 302, 304 and 306 of the image sensor 202 are positioned are opposite to each other with respect to the sub-scanning directions A and A' of the platen type and sheet feed type methods. In addition, sequences of the TDI pixel arrays 312, 332, and 352, and the normal pixel arrays 314, 334, and 354 of the R, G, and B channels 302, 304, and 306 are from the TDI pixel array 312 toward the normal pixel array 314 with respect to the sub-scanning direction A in the platen type method, but the sequences are from the normal pixel array 314 toward the TDI pixel array 312 with respect to the sub-scanning direction A' in the sheet feed type method, and thus, the sequences in the platen type method and the sheet feed type method are opposite to each other.

FIGS. 6A-6F illustrate an exemplary process of acquiring image data using an image sensor in a platen type method. FIGS. 6A-6F illustrate an exemplary R channel 302. However, in the G channel 304 and the B channel 306, a same process of acquiring the image data, illustrated in FIGS. 6A to 6F may be performed. In FIGS. 6A-6F, the original document 206a is divided into a first region 602 to a fourth region 608. Alternatively, the original document 206a may be divided into a lesser number of regions or a greater number of regions. As illustrated in FIGS. 6A-6F, when a copy or scanning command is issued while the original document 206a is aligned on the platen glass 220, the image sensor 202 reads the image data of the original document 206a while moving in the sub-scanning direction A.

As illustrated in FIG. 6A, the TDI pixel array 312 acquires TDI image data of the first region 602 of the original document 206a.

As illustrated in FIG. 6B, the TDI image data of the first region 602, acquired in a process illustrated in FIG. 6A, may be moved to and temporally stored in the TDI pixel data storage 320, the TDI pixel array 312 acquires TDI image data of a second region 604 of the original document 206a, and simultaneously, the normal pixel array 314 acquires normal image data of the first region 602 of the original document 206a. Here, Use of the term "normal" of the normal image data acquired by the normal pixel array 314 is merely for distinguishing from the TDI image data.

As illustrated in FIG. 6C, the TDI image data of the first region 602, stored in the TDI pixel data storage 320, is transmitted to the CCD shift register 324, and the normal image data of the first region 602, acquired by the normal pixel array 314, is transmitted to the CCD shift register 328. The TDI image data of the second region 604, acquired by the TDI pixel array 312, is temporally stored in the TDI pixel data storage 320. The TDI image data of the first region 602, stored in the CCD shift register 324, and the normal image data of the first region 602, stored in the CCD shift register 328, are added by the adder 330, and are output out of the image sensor 202. The TDI image data and the normal data of one region, that is, the first region 602 of the original document 206a are added, and thus, the image quality of the first region 602 is improved to further clarify an image of the first region 602. In FIG. 6C, while the TDI image data and the normal data of the first region 602 are added by the adder 330 and are output out of the image sensor 202, when the TDI image data of the second region 604 is temporally stored in the TDI pixel data storage 320, the TDI pixel array 312 acquires image data of a third region 606 of the original document 206a.

As illustrated in FIG. 6D, the TDI image data of the second region 604, stored in the CCD shift register 324, and normal image data of the second region 604, stored in the CCD shift register 328, are added by the adder 330, and are output out of the image sensor 202. The TDI image data of the second region 604, temporally stored in the TDI pixel data storage 320, and the normal image data of the second region 604, acquired by the normal pixel array 314, are respectively transmitted to and stored in the CCD shift register 324 and the CCD shift register 328. The TDI image data and normal image data of the second region 604 of the original document 206a are added by the adder 330 and are output out of the image sensor 202. The TDI image data and the normal data of one region, that is, the second region 604 of the original document 206a are added, and thus, the image quality of the second region 604 is improved to further clarify an image of the second region 604. TDI image data of the third region 606, acquired by the TDI pixel array 312 in the process illustrated in FIG. 6C, is temporally stored in the TDI pixel data storage 320, the TDI pixel array 312 acquires TDI image data of a fourth region 608, and the normal pixel array 314 acquires the normal image data of the third region 606.

As illustrated in FIG. 6E, the TDI image data of the third region 606, stored in the CCD shift register 324, and the normal image data of the third region 606, stored in the CCD shift register 328, are added by the adder 330, and are transmitted out of the image sensor 202. The TDI image data of the third region 606, stored in the TDI pixel data storage 320, and the normal image data of the third region 606, acquired by the normal pixel array 314, are respectively transmitted to and stored in the CCD shift register 324 and the CCD shift register 328. The TDI image data and normal image data of the second region 604 of the original document 206a are added by the adder 330 and are output out of the image sensor 202. The TDI image data and the normal data of one region, that is, the third region 606 of the original document 206a are added, and thus, the image quality of the third region 606 is improved to further clarify an image of the third region 606. TDI image data of the fourth region 608, acquired by the TDI pixel array 312 in the process illustrated in FIG. 6D, is temporally stored in the TDI pixel data storage 320, and the normal pixel array 314 acquires the normal image data of the fourth region 608.

As illustrated in FIG. 6F, the TDI image data of the fourth region 608, stored in the TDI pixel data storage 320, and the normal image data of the fourth region 608, acquired by the normal pixel array 314, are respectively transmitted to and stored in the CCD shift register 324 and the CCD shift register 328. The TDI image data of the fourth region 608, stored in the CCD shift register 324, and the normal data of the fourth region 608, stored in the CCD shift register 328, are added by the adder 330 and are output out of the image sensor 202. The TDI image data and the normal data of one region, that is, the fourth region 608 of the original document 206a are added, and thus, the image quality of the fourth region 608 is improved to further clarify an image of the fourth region 608.

As illustrated in FIGS. 6A-6F, a direction based on an order in which the TDI pixel array 312 and the normal pixel array 314 are positioned may be defined as a TDI direction. That is, a direction from the TDI pixel array 312 toward the normal pixel array 314 may be referred to as the TDI direction. The TDI direction and the order in which the TDI pixel array 312 and the normal pixel array 314 are positioned may be changed as necessary. The TDI direction may be changed according to a relative relationship of a sub-scanning direction (or a scanning direction) with respect to the order in which the TDI pixel array 312 and the normal pixel array 314 are positioned.

FIGS. 7A-7E illustrate an exemplary process of acquiring image data using an image sensor in a sheet feed type method. As illustrated in FIGS. 7A-7E, an order in which components of the image sensor 202 are positioned with respect to the sub-scanning direction A' is opposite to the order with respect to the sub-scanning direction A illustrated in FIGS. 6A-6F. That is, in FIGS. 6A-6F, the TDI pixel array 312 to the normal pixel array 314 is positioned with respect to the sub-scanning direction A. On the other hand, in FIGS. 7A-7E, the normal pixel array 314 to the TDI pixel array 312 is positioned with respect to the sub-scanning direction A'. This is because the original document 206 is fed through the automatic document feeder 108 in the sheet feed type method, as described with reference to FIGS. 5A-5B. As illustrated in FIGS. 7A-7E, when the order in which the components of the image sensor 202 are positioned is from the normal pixel array 314 toward the TDI pixel array 312 with respect to the sub-scanning direction A', the image sensor 202 operates in a different way from the case illustrated in FIGS. 6A-6F. Thus, image data is combined with respect to different locations of the original document 206, but not with respect to the same location of the original document 206, thus degrading image quality.

As illustrated in FIG. 7A, when last TDI image data of a previous document is stored in the TDI pixel data storage 320, image data of a new original document 206 is to be read.

In FIG. 7B, when the TDI pixel array 312 acquires image data of a first region 702 of the original document 206, the normal pixel array 314 acquires image data of a second region 704 of the original document 206. This is because the order in which the components of the image sensor 202 are positioned is from the normal pixel array 314 toward the TDI pixel array 312 with respect to the sub-scanning direction A'. However, if the normal pixel array 314 also acquires the image data of the first region 702 of the original document 206 like the TDI pixel array 312, the original document 206 needs to move in an opposite direction to the sub-scanning direction A'. In this case, effective operation is remarkably reduced, and also, the TDI pixel array 312 may acquire image data of an unwanted region while the normal pixel array 314 acquires the image data of the first region 702, thus degrading quality, or the TDI pixel array 312 may become in an idle state in which an image acquisition operation is not performed, thus degrading efficiency.

In FIG. 7C, the last TDI image data of the previous document, stored in the TDI pixel data storage 320, is transmitted to, and stored in, the CCD shift register 324, the TDI image data of the first region 702, acquired by the TDI pixel array 312, is temporally stored in the TDI pixel data storage 320, and normal image data acquired by the normal pixel array 314 is transmitted to and stored in the CCD shift register 328. The last TDI image data of the previous document, stored in the CCD shift register 324, and the normal image data of the first region 702, stored in the CCD shift register 28 are added by the adder 330. In a normal case, TDI image data and normal image data of the same region of the original document 206 need to be added. However, in FIG. 7C, TDI image data and normal image data of different regions of the original document 206 are added. This is because the order in which the components of the image sensor 202 are positioned is from the normal pixel array 314 toward the TDI pixel array 312 with respect to the sub-scanning direction A'. The TDI pixel array 312 acquires image data of the second region 704 of the original document 206, and the normal pixel array 314 acquires normal image data of a third region 706 of the original document 206.

As illustrated in FIG. 7D, the normal image data of the third region 706, acquired by the normal pixel array 314 in the process illustrated in FIG. 7C, is stored in the CCD shift register 328, and the TDI image data of the first region 702 of the original document 206, acquired by the TDI pixel array 312, is stored in the CCD shift register 324. The normal image data of the third region 706, stored in the CCD shift register 328, and the TDI image data of the first region 702, stored in the CCD shift register 324, are added by the adder 330. In a normal case, the TDI image data and normal image data of the first region 702 of the original document 206 need to be added or the TDI image data and normal image data of the third region 706 of the original document 206 need to be added. However, in FIG. 7D, image data of different regions of the original document 206 are added. This is because the order in which the components of the image sensor 202 are positioned is from the normal pixel array 314 toward the TDI pixel array 312 with respect to the sub-scanning direction A'. The TDI pixel array 312 acquires image data of the third region 706 of the original document 206 and the normal pixel array 314 acquires normal image data of a fourth region 708 of the original document 206.

As illustrated in FIG. 7E, the normal image data of the fourth region 708, acquired by the normal pixel array 314 in the process illustrated in FIG. 7D, is stored in the CCD shift register 328, and the TDI image data of the first region 702 of the original document 206, acquired by the TDI pixel array 312, is stored in the CCD shift register 324. The normal image data of the fourth region 708, stored in the CCD shift register 328, and the TDI image data of the second region 704, stored in the CCD shift register 324, are added by the adder 330. In a normal case, TDI image data and normal image data of the same region of the original document 206 need to be added. However, in FIG. 7E, TDI image data and normal image data of different regions of the original document 206 are added. This is because the order in which the components of the image sensor 202 are positioned is from the normal pixel array 314 toward the TDI pixel array 312 with respect to the sub-scanning direction A'. The TDI pixel array 312 acquires image data of the fourth region 708 of the original document 206. Since the normal pixel array 314 has already read image data of the fourth region 708 of the original document 206 and output the image data out of the image sensor 202 through the adder 330, even if the TDI pixel array 312 acquires image data of the fourth region 708 of the original document 206, the image data of the fourth region 708, acquired by the TDI pixel array 312, is not useful.

As described with reference to FIGS. 6A-6F, in the platen type, an order in which the TDI pixel array 312 and normal pixel array 314 of the image sensor 202 are positioned corresponds to the sub-scanning direction A, and thus, TDI image data and normal image data of the same region of the original document 206a are obtained, thus improving image quality. On the other hand, as illustrated in FIGS. 7A-7E, in the sheet feed type, the order in which the TDI pixel array 312 and normal pixel array 314 of the image sensor 202 are positioned, corresponds to an opposite direction to the sub-scanning direction A', and thus, a normal effect of improving image quality is not ensured. Thus, the image forming apparatus 100 according to an embodiment of the present invention distinguishes operations using the platen type and sheet feed type methods and controls a TDI operation in a different way. Thus, when the platen type method is used, image quality may be improved by the TDI operation. When the sheet feed type is used, image quality may be prevented from rather degrading due to the TDI operation.

Figure 8:
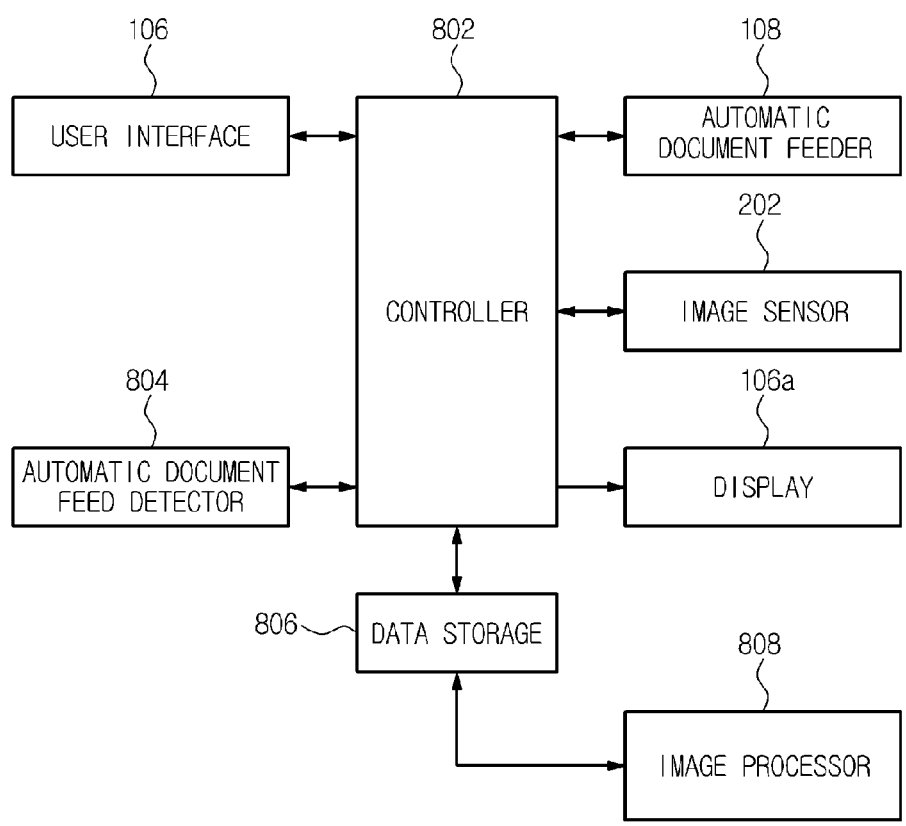
FIG. 8 illustrates an exemplary control system of an image forming apparatus according to an embodiment of the present invention.

FIG. 8 illustrates an exemplary control system of the image forming apparatus 100 according to an embodiment of the present invention. As illustrated in FIG. 8, a controller 802 to control an overall operation of the image forming apparatus 100 is electrically connected to the user interface 106, an automatic document feed detector 804, the automatic document feeder 108, the image sensor 202, the display 106a, and a data storage 806 such that the user interface 106 communicates with the automatic document feed detector 804, the automatic document feeder 108, the image sensor 202, the display 106a, and the data storage 806. A user interface 106, the display 106a, the automatic document feeder 108, and the image sensor 202 have been described with reference to FIGS. 1 and 2. When the original document 206 is fed through the automatic document feeder 108, the automatic document feed detector 804 detects the feeding and notifies the controller 802 of the feeding. The controller 802 detects that the original document 206 is fed through the automatic document feeder 108 from a detection signal generated by the automatic document feed detector 804. When the controller 802 detects that the original document 206 is fed through the automatic document feeder 108, the controller 802 deactivates the TDI pixel array 312 of the image sensor 202 to deactivate a TDI function. The data storage 806 stores programs for control of the controller 802 and data generated during control of the controller 802, in particular, image data acquired through the image sensor 202. The image data stored in the data storage 806 is also transmitted to an image processor 808. The image processor 808 processes the image data stored in the data storage 806 to perform operations such as copy, printing, or the like.

Figure 9:
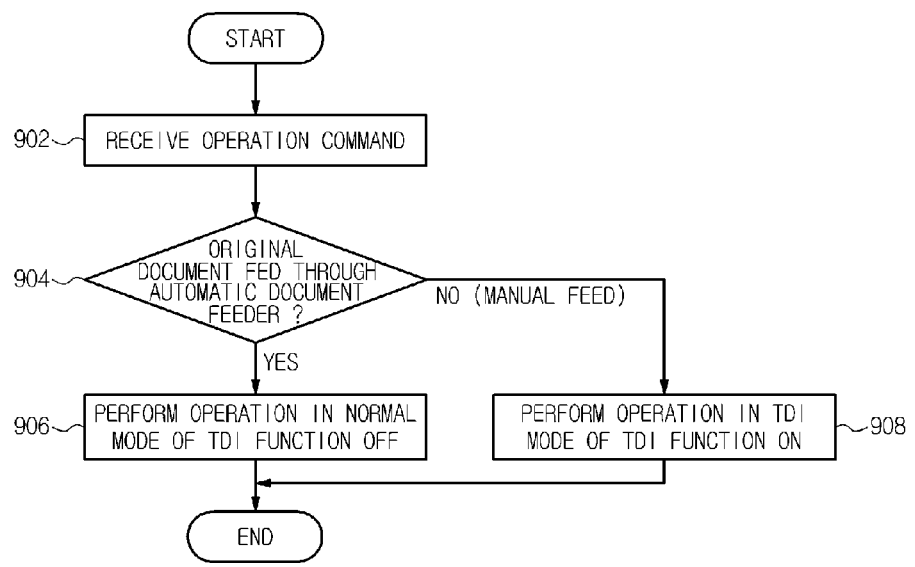
FIG. 9 illustrates an exemplary method of controlling a time delay integration mode according to a document feed method in an image forming apparatus, according to an embodiment of the present invention.

FIG. 9 illustrates an exemplary method of controlling a TDI mode according to a document feed method in an image forming apparatus, according to an embodiment of the present invention. The control method illustrated in FIG. 9 may be performed by the control system of FIG. 8. As illustrated in FIG. 9, the controller 802 receives an operation command issued through the user interface 106 (operation 902). Operations of the operation command may include copy, scanning, or the like, which include reading image data from the original documents 206 and 206a. When the controller 802 receives the operation command, the controller 802 determines whether a corresponding operation corresponds to an operation of feeding an original document through the automatic document feeder 108 (operation 904). For this determination, the controller 802 uses the detection signal generated from the automatic document feed detector 804. When it is determined that the corresponding operation corresponds to the operation of feeding an original document through the automatic document feeder 108 (YES path of operation 904), the controller 802 deactivates the TDI pixel array 312 of the image sensor 202 to deactivate the TDI function and then performs the operation in a normal mode (906). The normal mode refers to the remaining operation modes except for the TDI mode. As described with reference to FIGS. 7A-7E, when the original document is fed through the automatic document feeder 108, the normal pixel array 314 to the TDI pixel array 312 is positioned in this order with respect to the sub-scanning direction A', the TDI function is not normally performed. On the other hand, when it is determined that the corresponding operation is not the operation of feeding the original document through the automatic document feeder 108 (No path of operation 904), for example, when it is determined that the original document is fed by manual feed or the like such that the sequence of the image sensor 202 is from the TDI pixel array 312 toward the normal pixel array 314 with respect to the sub-scanning direction A, the controller 802 activates the TDI pixel array 312 of the image sensor 202 to activate the TDI function and then performs the operation in the TDI mode (operation 908). This is because, as described with reference to FIGS. 6A-6F, when the operation is performed while the original document is aligned on the platen glass 220 and the image sensor 202 moves in the sub-scanning direction A, since the original document is fed such that the image sensor 202 moves from the TDI pixel array 312 toward the normal pixel array 314 with respect to the sub-scanning direction A, the TDI function using the TDI pixel array 312 is activated to perform the corresponding operation, thereby improving image quality. Alternatively to the case of FIG. 9, if the order in which the components of the image sensor 202 are positioned is from the TDI pixel array 312 toward the normal pixel array 314 with respect to the sub-scanning direction A' when the original document is fed through the automatic document feeder 108, and the order in which the components of the image sensor 202 are positioned is from the normal pixel array 314 toward the TDI pixel array 312 with respect to the sub-scanning direction A when the image sensor 202 scans the original document loaded on the platen glass 220, the controller 802 may control the image sensor 202 to activate the TDI function of the image sensor 202 when the original document is fed through the automatic document feeder 108 and to deactivate the TDI function of the image sensor 202 when the image sensor 202 scans the original document loaded on the platen glass 220.

Figure 10:
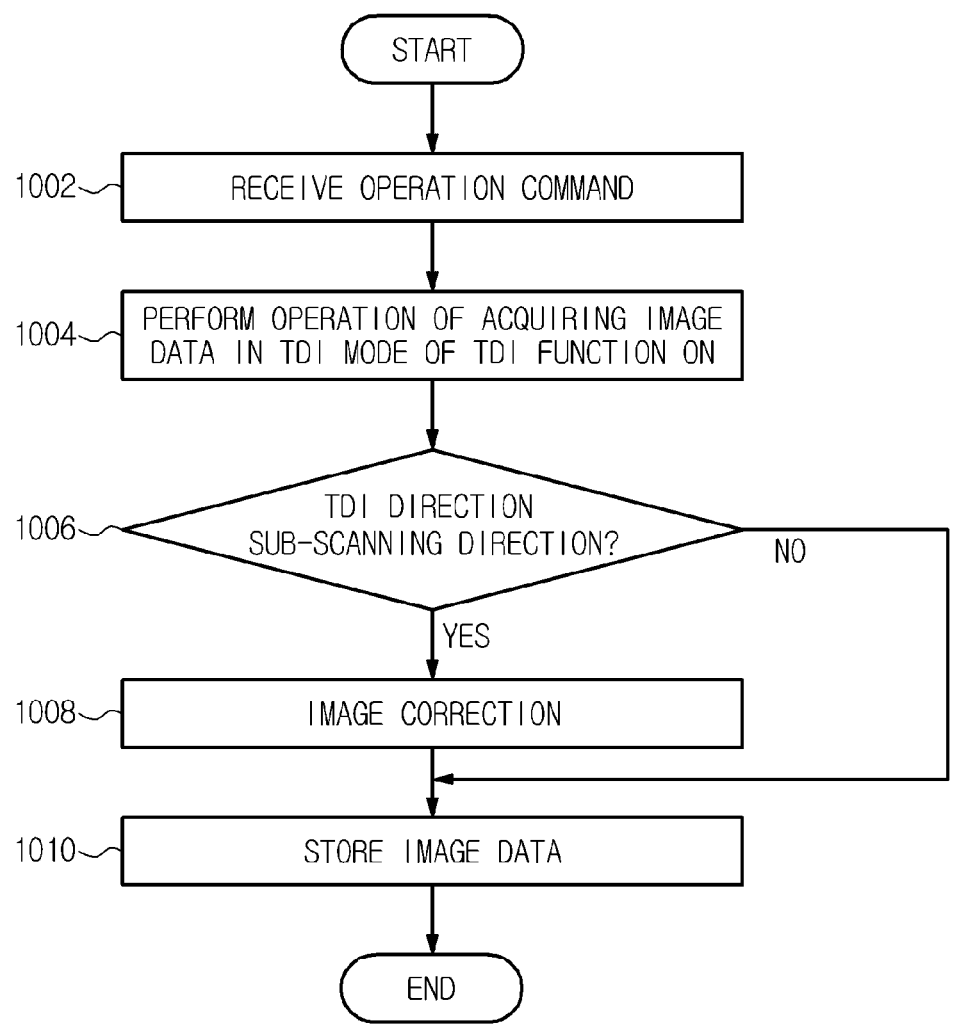
FIG. 10 illustrates an exemplary method of controlling a time delay integration mode according to a document feed method in an image forming apparatus, according to an embodiment of the present invention.

FIG. 10 illustrates an exemplary method of controlling a TDI mode according to a document feed method in an image forming apparatus, according to an embodiment of the present invention. The control method illustrated in FIG. 10 may be performed by the control system of FIG. 8. As illustrated in FIG. 10, the controller 802 receives an operation command issued through the user interface 106 (operation 1002). Operations of the operation command may include copy, scanning, or the like, which includes reading image data from the original documents 206 and 206a. When the controller 802 receives the operation command, the controller 802 deactivates the TDI function to perform an operation of acquiring image data in the TDI mode (operation 1004). That is, the controller 802 performs the operation of acquiring image data in the TDI mode regardless of whether an original document of a corresponding operation is fed through the automatic document feeder 108 or is aligned and fed on the platen glass 220. After the operation of acquiring image data is performed, whether a TDI direction and a sub-scanning direction are different in the corresponding operation is determined (operation 1006), which is performed in order to determine whether an additional operation for improvement of image quality needs to be performed according to whether the TDI direction and the sub-scanning direction are different. The TDI direction refers to a direction based on an order in which the TDI pixel array 312 and the normal pixel array 314 are positioned. That is, a direction from the TDI pixel array 312 toward the normal pixel array 314 may be referred to as the TDI direction. The TDI direction corresponds to the sub-scanning direction when the TDI pixel array 312 to the normal pixel array 314 is positioned in this order with respect to the sub-scanning direction A, as described with reference to FIGS. 6A-6F. On the other hand, the TDI direction does not correspond to the sub-scanning direction when the normal pixel array 314 to the TDI pixel array 312 is positioned in this order with respect to the sub-scanning direction A', as described with reference to FIGS. 7A-7E. The TDI direction may be determined according to which components acquire image data in advance among the TDI pixel array 312 and the normal pixel array 314 of the image sensor 202, or the TDI direction may be determined using various methods such as a method in which TDI direction information is provided to the controller 802 in advance such that the controller 802 recognizes the TDI direction information. When the TDI direction is different from the sub-scanning direction in the corresponding operation (YES of operation 1006), the controller 802 performs image correction on currently acquired image data (operation 1008). The image correction may include any correction for improvement of image quality, for example, edge enhancement filtering such as a sharpening operation for sharpening and clarifying an image. The image data on which the image correction is completely performed is stored (operation 1010). When the TDI direction corresponds to the sub-scanning direction in the corresponding operation (No path of operation 1006), the controller 802 stores the currently acquired image data (operation 1010). When the operation of acquiring image data is performed regardless of whether the TDI direction and the sub-scanning direction are different, it is not necessary to design or change hardware for activation or deactivation of the TDI pixel array 312 of the image sensor 202, and instead, only correction of acquired image data is performed in terms of software, thereby reducing a burden in terms of hardware design or change.

According to an exemplary embodiment of the present invention, an image forming apparatus including a time delay integration image sensor for improvement of image quality and operation speed may obtain high image quality at high speed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image forming apparatus comprising:
   at least one document feeder to feed an original document;
   a time delay integration image sensor to scan the original document and read image data including a plurality of channels each comprising a first pixel array, which is a time delay integration pixel array and a second pixel array that is not a time delay integration pixel array; and
   a controller to activate a time delay integration function of the time delay integration image sensor when a direction for feed of the original document corresponds to a sub-scanning direction of the time delay integration image sensor, and to deactivate the time delay integration function of the time delay integration image sensor when the direction for feed of the original document does not correspond to the sub-scanning direction of the time delay integration image sensor, during reading of the original document, and to control a direction of time delay integration based on a relationship between a scanning or sub-scanning direction and a positioning of the first pixel array and the second pixel array.

2. The image forming apparatus according to claim 1, wherein the at least one document feeder comprises:
   a first document feeder to feed the original document in a first direction; and
   a second document feed to feed the original document in an opposite direction to the first direction.

3. The image forming apparatus according to claim 2, wherein the first document feeder is a sheet feed type document feeder to automatically feed the original document, and the second document feeder is a platen type document feeder to fix the original document onto a platen glass.

4. The image forming apparatus according to claim 1, wherein
   the second pixel array installed to be spaced apart from the first pixel array by a predetermined interval in the sub-scanning direction.

5. An image forming apparatus comprising:
   at least one document feeder to feed an original document;
   a time delay integration image sensor to scan the original document and read image data; and
   a controller to activate a time delay integration function of the time delay integration image sensor and to read the image data from the original document, and to perform image correction for improvement of quality of the image data by acquiring a plurality of image data from a same target object at a time delay and integrating the plurality of image data when a direction for feed of the original document does not correspond to a sub-scanning direction of the time delay integration image sensor.

6. The image forming apparatus according to claim 5, wherein the at least one document feeder comprises:
   a first document feeder to feed the original document in a first direction; and
   a second document feed to feed the original document in an opposite direction to the first direction.

7. The image forming apparatus according to claim 6, wherein the first document feeder is a sheet feed type document feeder to automatically feed the original document, and the second document feeder is a platen type document feeder to fix the original document onto a platen glass.

8. The image forming apparatus according to claim 5, wherein the time delay integration image sensor comprises:
a first pixel array; and
a second pixel array installed to be spaced apart from the first pixel array by a predetermined interval in the sub-scanning direction.

9. The image forming apparatus according to claim 8, wherein the first pixel array is a time delay integration pixel array.

10. A method of controlling an image forming apparatus comprising at least one document feeder to feed an original document, and a time delay integration image sensor including a plurality of channels each comprising a first pixel array, which is a time delay integration pixel array and a second pixel array that is not a time delay integration pixel array to scan the original document and read image data, the method comprising:
receiving an operation command;
reading image data from the original document in response to the operation command;
activating a time delay integration function of the time delay integration image sensor when a direction for feed of the original document corresponds to a sub-scanning direction of the time delay integration image sensor during reading of the original document;
controlling a direction of the time delay integration based on a relationship between a scanning or sub-scanning direction and a positioning of the first pixel array and the second pixel array; and
deactivating the time delay integration function of the time delay integration image sensor when the direction for feed of the original document does not correspond to the sub-scanning direction of the time delay integration image sensor during the reading of the original document.

11. A method of controlling an image forming apparatus comprising at least one document feeder to feed an original document, and a time delay integration image sensor to scan the original document and read image data, the method comprising:
receiving an operation command;
activating a time delay integration function of the time delay integration image sensor to read image data from the original document in response to the operation command; and
performing image correction for improvement of quality of the image data by acquiring a plurality of image data from a same target object at a time delay and integrating the plurality of image data when a direction for feed of the original document does not correspond to a sub-scanning direction of the time delay integration image sensor.

12. An image forming apparatus comprising:
a first document feeder to feed an original document in a first direction;
a second document feed to feed the original document in a second direction;
a time delay integration image sensor including a plurality of channels each comprising a first pixel array, which is a time delay integration pixel array and a second pixel array that is not a time delay integration pixel array to scan the original document fed through the first document feeder in a first sub-scanning direction to read image data, and to scan the original document fed through the second document feeder in a second sub-scanning direction to read image data; and
a controller to deactivate a time delay integration function of the time delay integration image sensor when the original document fed through the first document feeder is scanned in the first sub-scanning direction to read the image data, and to activate the time delay integration function of the time delay integration image sensor when the original document fed through the second document feeder is scanned in the second sub-scanning direction to read the image data, and to control a direction of time delay integration based on a relationship between a scanning or sub-scanning direction and a positioning of the first pixel array and the second pixel array.

13. The image forming apparatus according to claim 12, wherein:
the first document feeder is an automatic document feeder to automatically feed the original document and transfer the original document along a preset feed path such that the original document is scanned by the image sensor while being transferred on a sensing surface of the time delay integration image sensor in an opposite direction to the first sub-scanning direction; and
the second document feeder is a platen type document feeder to allow the original document aligned on a surface of a platen glass to be scanned while the time delay integration image sensor moves in the second sub-scanning direction when the original document is aligned on the surface of the platen glass.

14. The image forming apparatus according to claim 12, wherein:
the first document feeder is a platen type document feeder to allow the original document aligned on a surface of a platen glass to be scanned while the time delay integration image sensor moves in the second sub-scanning direction when the original document is aligned on the surface of the platen glass; and
the second document feeder is an automatic document feeder to automatically feed the original document and transfer the original document along a preset feed path such that the original document is scanned by the image sensor while being transferred on a sensing surface of the time delay integration image sensor in an opposite direction to the first sub-scanning direction.

* * * * *